C. V. JOHNSON.
FLYING MACHINE.
APPLICATION FILED NOV. 10, 1910.
1,036,249.
Patented Aug. 20, 1912.
6 SHEETS—SHEET 5.
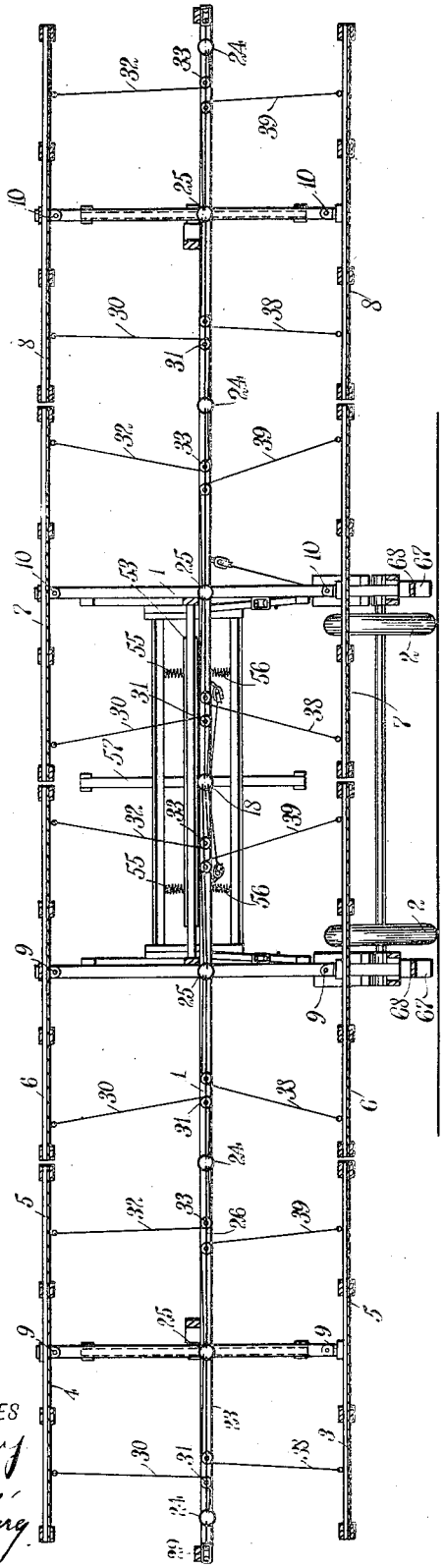
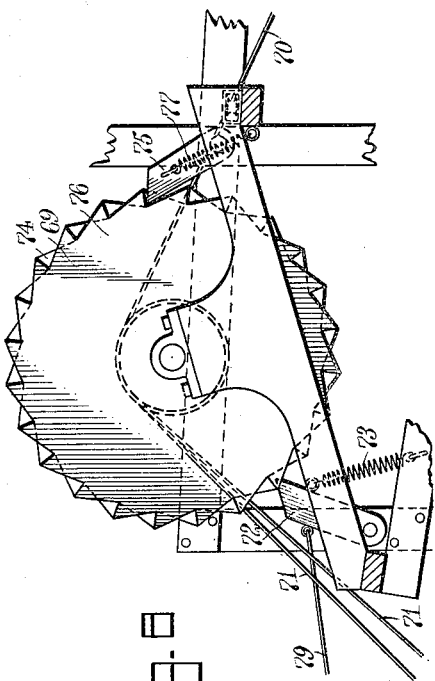
WITNESSES
INVENTOR
Carl V. Johnson
BY
ATTORNEYS

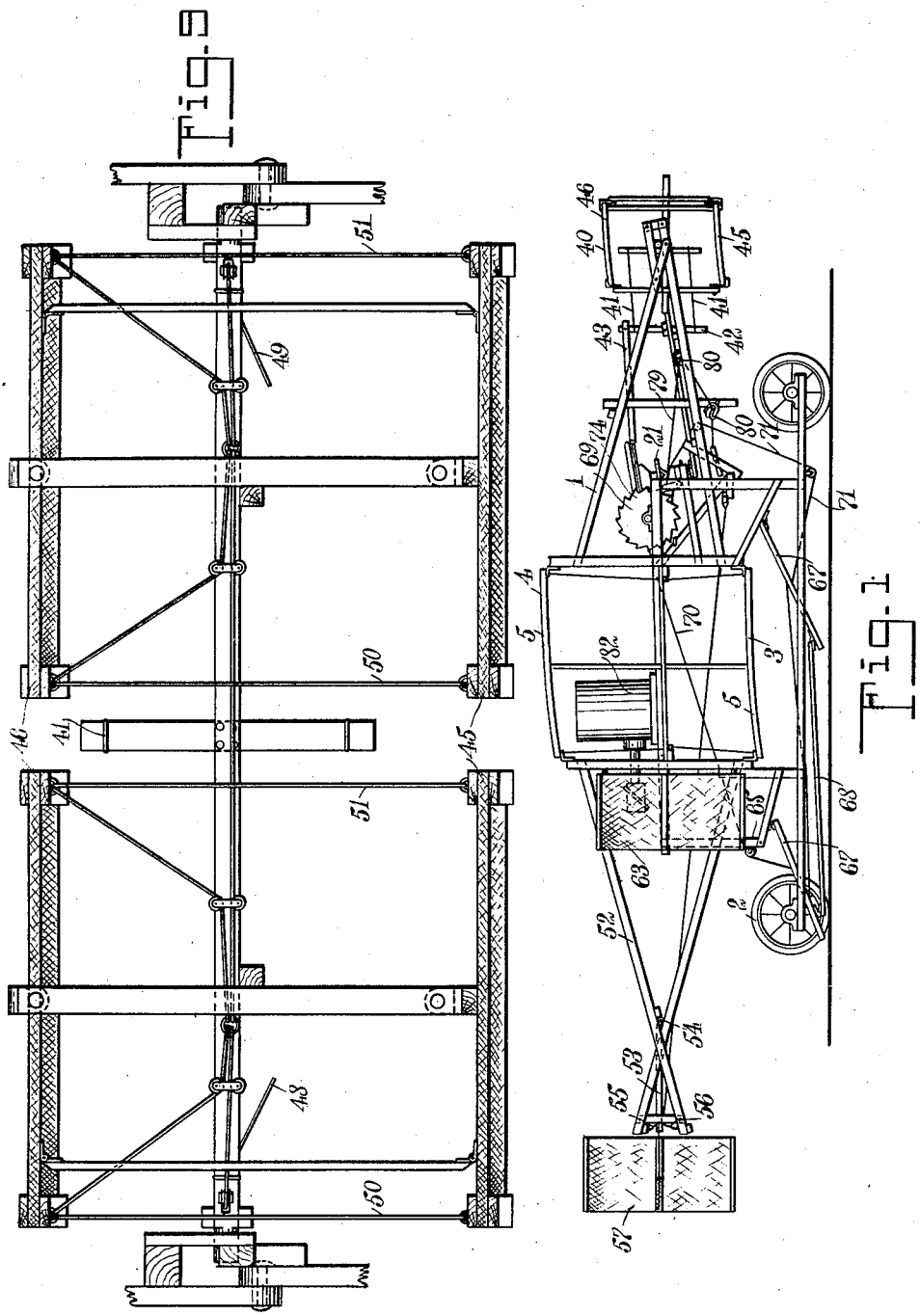

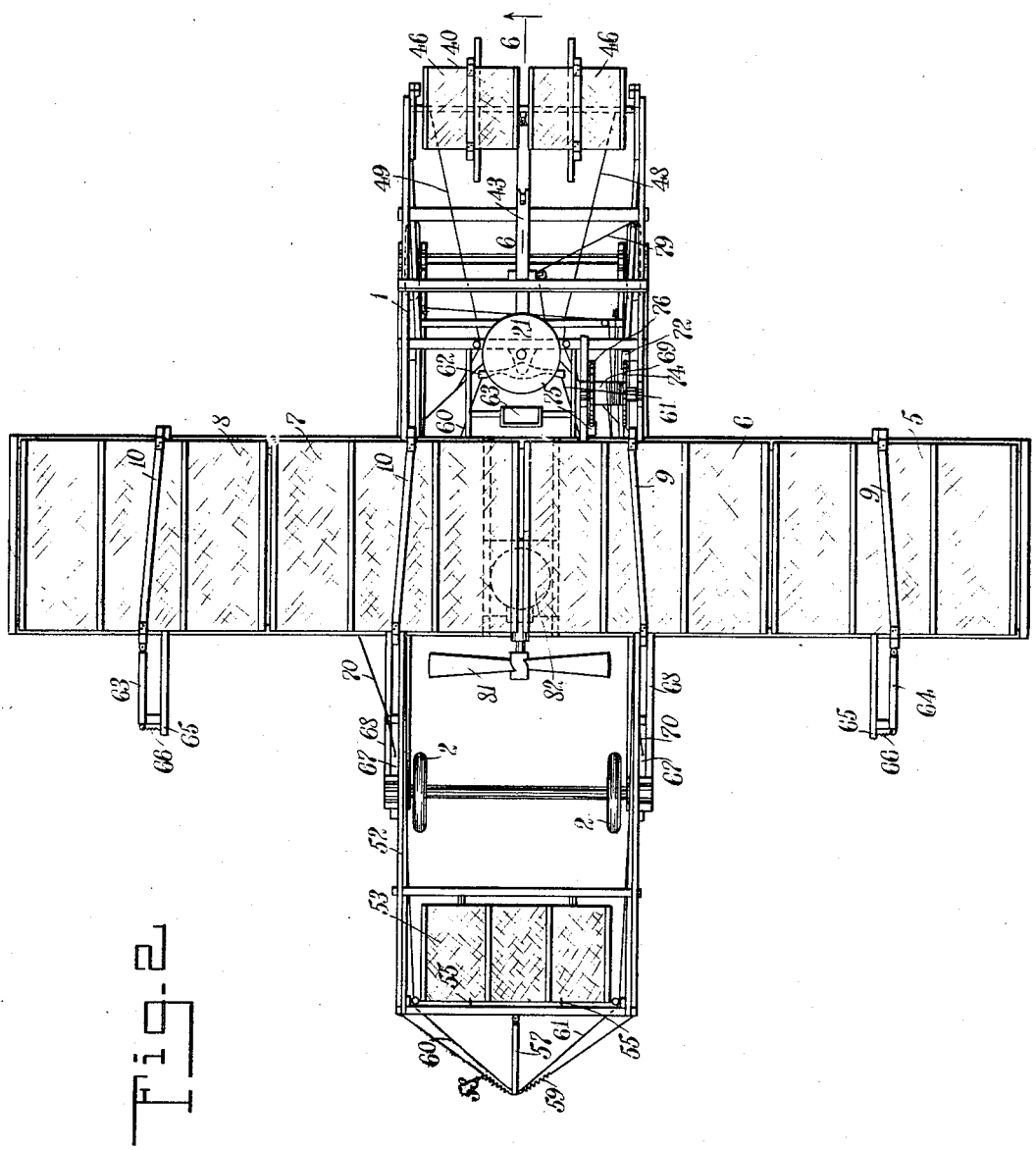

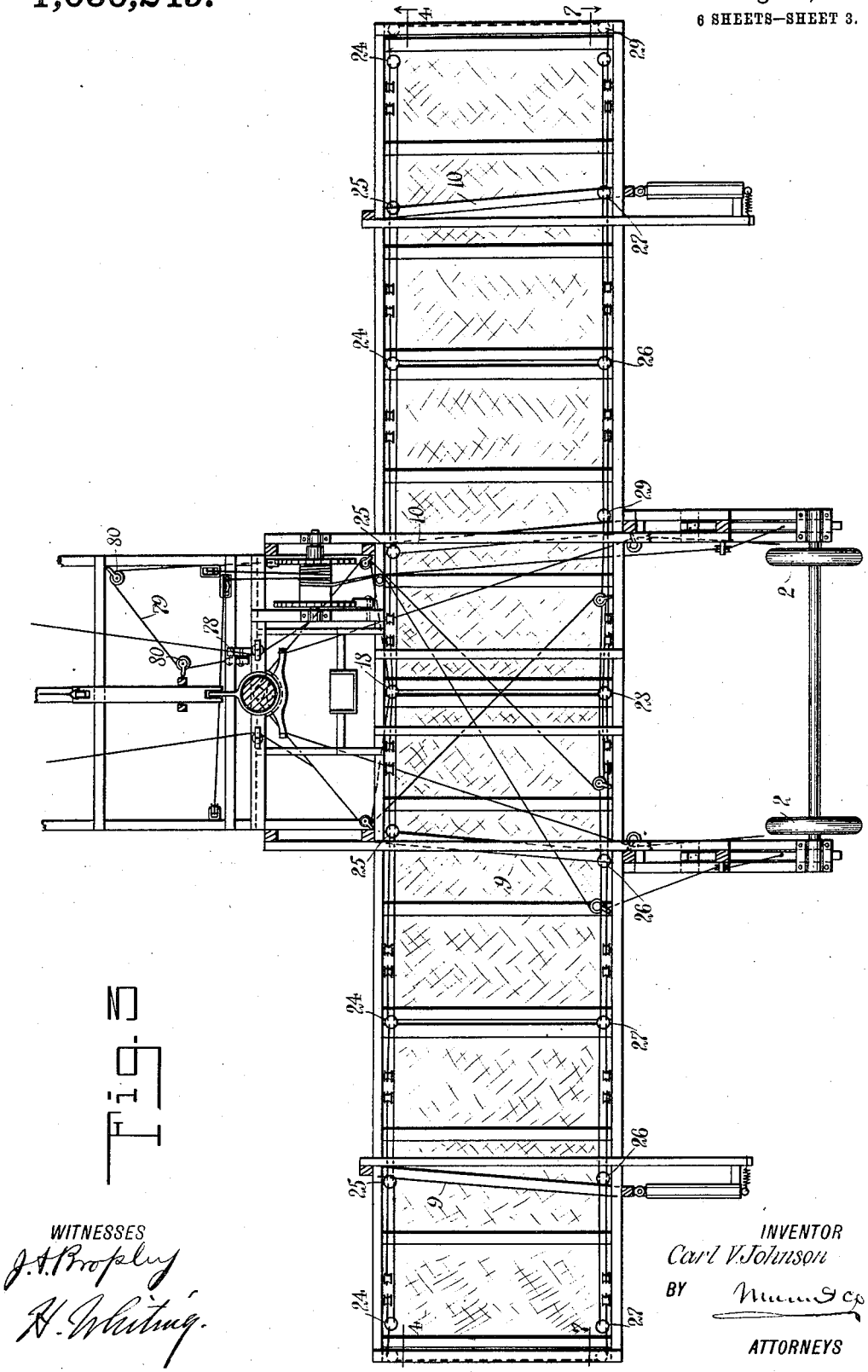

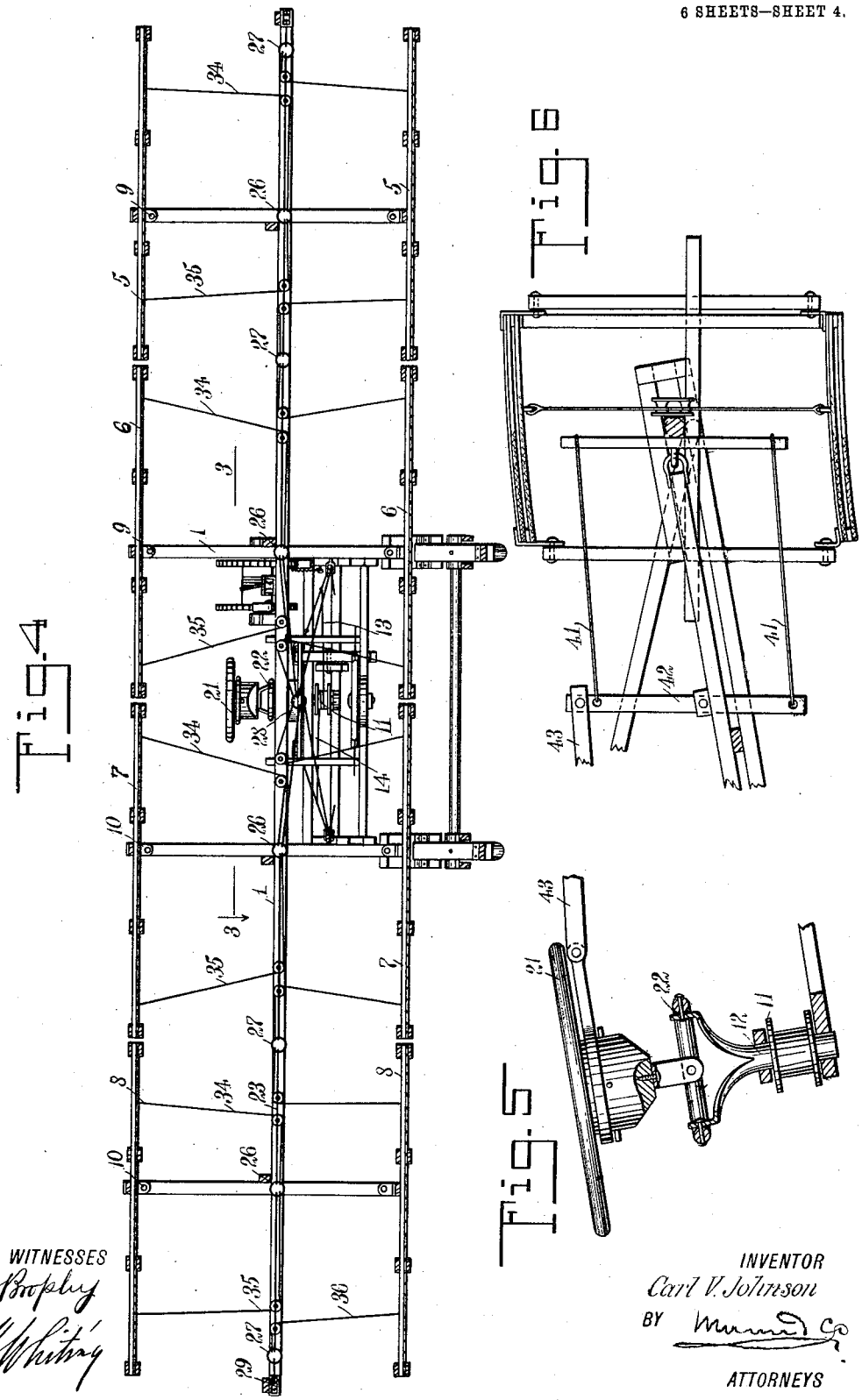

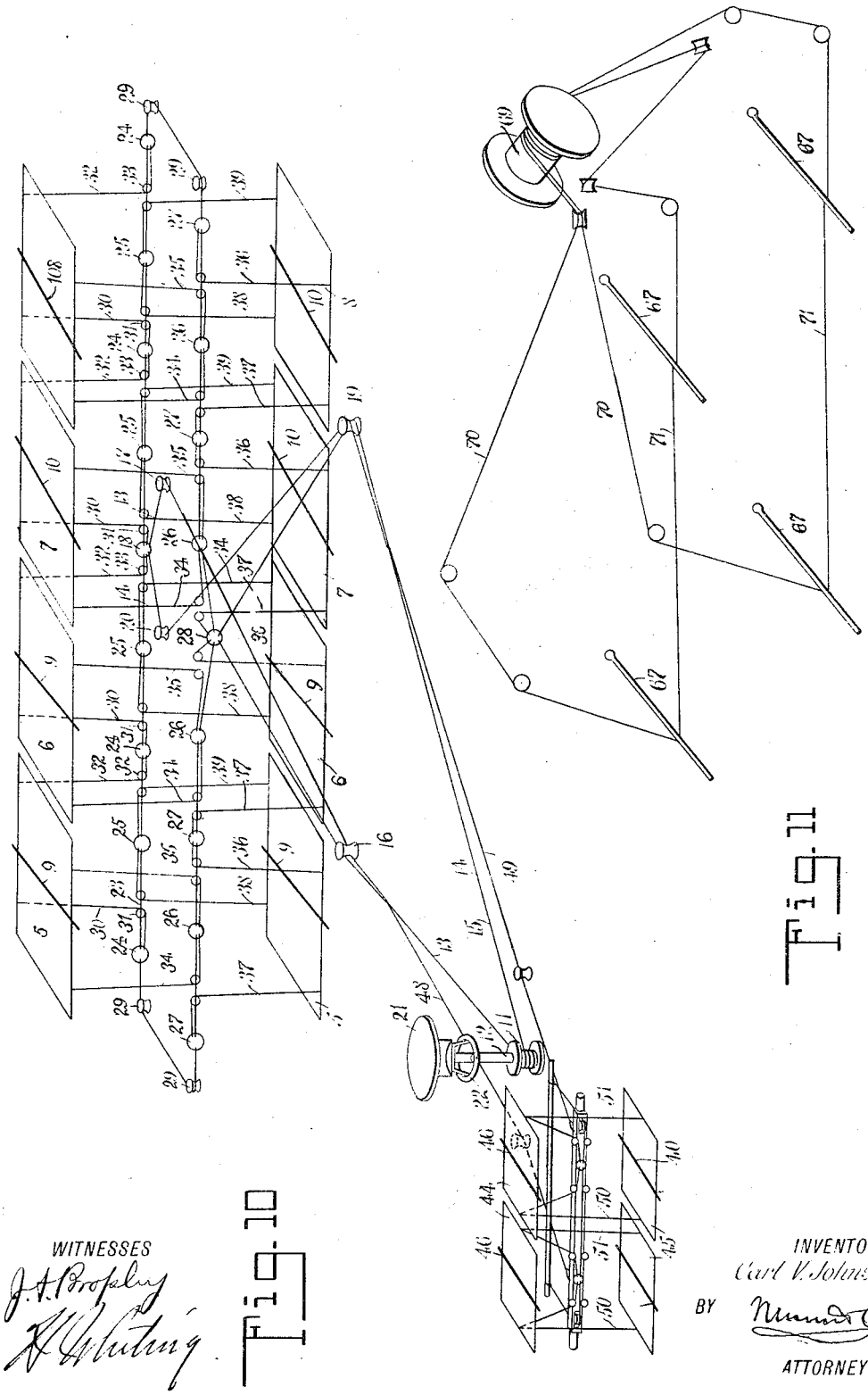

UNITED STATES PATENT OFFICE.

CARL V. JOHNSON, OF GOLDFIELD, NEVADA.

FLYING-MACHINE.

1,036,249.  Specification of Letters Patent.  Patented Aug. 20, 1912.

Application filed November 10, 1910. Serial No. 591,580.

*To all whom it may concern:*

Be it known that I, CARL V. JOHNSON, a citizen of the United States, and a resident of Goldfield, in the county of Esmeralda and State of Nevada, have invented a new and Improved Flying-Machine, of which the following is a full, clear, and exact description.

This invention relates to a new and improved flying machine of the heavier-than-air type commonly known as aeroplanes.

An object of this invention is to provide a flying machine which will be simple in construction, inexpensive to manufacture, strong, durable, readily controlled both in horizontal and vertical directions, and easily started and stopped.

A further object of this invention is to provide a flying machine in which the main supporting surface is provided by means of a plurality of individual planes capable of pivotal movement and having their pivotal axes arranged on a diagonal, so as to vary the angle of incidence.

A still further object of this invention is to provide a flying machine in which the controlling mechanism for the steering, elevational and main planes, and the brake, are all conveniently located within easy reach of the operator.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a side view in elevation; Fig. 2 is a top plan view; Fig. 3 is a fragmentary horizontal section between the upper and lower series of supporting planes, on the line 3—3 of Fig. 4; Fig. 4 is a vertical transverse section on the line 4—4 of Fig. 3; Fig. 5 is an enlarged detail view of the controlling wheel, partly in section to show the underlying structure; Fig. 6 is a fragmentary longitudinal section on the line 6—6 of Fig. 2, showing the means for operating the elevational planes; Fig. 7 is a vertical transverse section on the line 7—7 of Fig. 8; Fig. 8 is an enlarged detail, showing the brake drum and the controlling mechanism therefor; Fig. 9 is an enlarged fragmentary front view in elevation of the elevational planes; Fig. 10 is a diagrammatic perspective, illustrating the controlling means for the supporting planes and the elevational planes; and Fig. 11 is a diagrammatic perspective illustration showing the connections of the controlling means for the brakes.

Referring more particularly to the separate parts of the device, 1 indicates a frame, which may be of any suitable character and material and is adapted to be movably supported on the ground by any suitable means, such as the rollers or wheels 2. For the purpose of supporting the machine in air, there are provided a pair of superposed series 3 and 4 of independent planes 5, 6, 7 and 8, arranged in superposed pairs. The number of series of supporting planes, as well as the number of planes in each series, may be varied according to the supporting surface desired. An important feature of this invention is that these planes are all pivotally connected to the frame 1 so that they can be swung to vary their angle of incidence to the air, through which they normally pass. The pivotal connection of the planes 5 to 8 may be of any suitable character, and in this case is shown to be formed of rods 9 and 10 secured to the planes intermediate their side edges, and pivotally secured at their ends in the frame 1. It is to be noted that these rods, instead of being set exactly longitudinally of the middle, are set diagonally, so as to vary the angle of incidence of the planes for which they form the pivotal supports, when the latter are moved. The pivotal rods 9 extend forward to the right diagonally, and the pivotal rods 10 extend forward to the left diagonally, so that the rods 9 and 10 converge toward each other.

For the purpose of manipulating the planes 5 to 8, there is provided a drum 11, secured to a shaft 12 and having extending from opposite sides thereof, stretches 13 and 14 of a flexible connection 15 (see Figs. 5 and 10). The stretch 13 passes over suitable pulleys 16 and 17 to one side of a master connecting link or ring 18, and the stretch 14 passes over suitable pulleys 19 and 20 to the opposite side of the connecting ring 18. It will thus be seen that the stretches 13 and 14 operate the ring 18 from opposite sides, and also are wound on opposite sides of the drum 11.

For the purpose of manipulating the drum 11 and the shaft 12, there is provided a hand wheel 21 connected to the shaft 12 by a universal joint 22, for a purpose to be described hereinafter.

Imagining yourself seated at the rear of the wheel 21, facing the front, a turn of the wheel to the right will move the ring 18 to the right, and a turn of the wheel 21 to the left will move the ring 18 to the left. This motion is transmitted by a plurality of intermediate flexible connections 23, to a plurality of back rings 24 and 25, and also to a plurality of front rings 26 and 27, and further, to a master ring 28, corresponding to the rear master ring 18, only located in front. This forms a continuous endless connection passing over suitable guide pulleys 29, whereby a single movement of the wheel 21 to the right will circulate the continuous endless connection to the left, or in a counter-clockwise direction, and a simple rotation of the wheel 21 to the left will circulate or rotate the endless connection to the right, or in a clockwise direction.

Extending from the rear right-hand side of the upper supporting planes 5, 6, 7 and 8, over suitable guide pulleys 31, from left to right, to points where they are secured to the rear rings 24, there are provided flexible connections 30, which transmit a movement of the master ring 18 to the right of the upper supporting planes, so as to depress their rear right-hand sides. Similarly, the opposite sides of the rings 18 and 24 are connected by flexible connections 32, passing over suitable guide pulleys 33 to the rear left-hand side of the upper supporting planes 5 to 8, so that a movement of the master ring 18 to the right will depress the rear left-hand sides of the upper supporting planes. Similarly, the front right-hand side of the upper supporting planes 5 to 8 are connected, by flexible connections 34, to the rings 26, and the front left-hand side of the upper supporting planes are connected to the opposite sides of the rings 26 by means of flexible connections 35. Thus, a movement of the master ring 18 to the right will simultaneously depress the right-hand sides of all of the upper planes, and a movement of the master ring 18 to the left will simultaneously depress the left-hand sides of all of the upper planes, and elevate the opposite sides. Similar connections are provided for the lower supporting planes 5 to 8, so that they will move simultaneously in the same direction as the upper supporting planes. For example, the left-hand sides of the lower supporting planes are connected by flexible connections 36 to one side of the rings 27 and 28, and the front right-hand sides are connected to the opposite sides of the rings 27 and 28 by means of flexible connections 37. Likewise, the rear right and left sides of the lower supporting planes are connected respectively by flexible connections 38 and 39 to the right and left-hand sides of the rings 25. It will thus be seen that a rotation of the wheel 21 to the left will depress the left-hand side of all of the upper and lower supporting planes and correspondingly elevate the right-hand side. A movement of the wheel 21 to the right will accomplish the opposite result. Inasmuch, however, as the pivot of the planes is diagonal, the angle of incidence will be varied to a certain extent in the different planes at the same time that the tilting takes place.

The frame 1 extends forwardly of the supporting planes 5 to 8, where it is provided with an elevational rudder 40, pivoted to the frame so as to swing about a horizontal transverse axis. The rudder as a whole is connected by connecting rods 41 to a lever 42, which in turn is connected by a link 43 to the controlling wheel 21. The purpose of the universal joint 22 will now be seen, in that it permits a swinging of the upper portion of the wheel, so as to vary the angle of incidence of the elevational rudder 40 without interfering with the driving connections between the wheel 21 and the drum 11.

While the elevational rudder 40 may be of any suitable character, it preferably consists of a plurality of upper planes 44 and lower planes 45. These planes are pivotally connected by means of bars 46, so that they may swing similar to the supporting planes 4 to 8, and are controlled from the wheel 21 by being connected to the master ring 28 by suitable flexible connections 48 and 49 passing over suitable guide pulleys. The planes 44 and 45 are adapted to swing in unison, by being connected together on opposite sides, by means of flexible connections 50 and 51. The frame 1 also extends to the rear of the main portion thereof, as at 52, where it is provided with a trailing plane 53, pivoted at its forward end, as at 54 and held in a normal horizontal position by means of springs 55 and 56, which extend in opposite directions and are connected to suitable portions of the extension frame 52. On this extension frame 52, there is also provided a vertically-extending directional rudder 57, which is normally held in a longitudinally-extending position by means of springs 58 and 59, connected to opposite sides thereof and to the frame. This rudder, however, is capable of movement either to the right or to the left, for the purpose of directing the flying machine as a whole either to the right or to the left. For this purpose, there are provided flexible connections 60 and 61, extending from opposite sides of the rear of the rudder, which is pivotally connected to the frame 52 at its forward end, and after passing over a suitable guide pulley, engaging a foot lever 62 pivoted intermediate its ends and located in juxtaposition to an operator's seat 63'.

Vertically-extending pivotal supporting equilibrium planes 63 and 64 are located to the rear of the series of supporting planes on each side of the machine. These equilibrium planes are normally prevented from swinging inwardly by means of stops in the form of braces 65, but are permitted to swing outwardly in a yielding manner when the wind blows against them, by means of springs 66, which normally hold them in engagement with the stops 65.

For the purpose of forming brakes to slow up the machine when in close proximity to, or when riding on, the ground, there are provided braking members in the form of legs 67 pivotally connected to the frame 1 and pivotally connected together by means of links 68. The opposite side of these legs 67 are connected in operative relation with opposite sides of a drum 69 by means of flexible connections 70 and 71, which pass over suitable guide pulleys. This is illustrated diagrammatically in Fig. 11. This drum 69 is rotatably supported on the frame and held from rotating in one direction by means of a pawl 72 (see Fig. 8), which is held by means of a spring 73 into engagement with a ratchet wheel 74 formed on the drum 69. The drum 69 is held from rotation in the opposite direction by means of a pawl 75, which is held in engagement with a ratchet wheel 76 facing in the opposite direction to the ratchet wheel 74, by means of a spring 77. The pawl 72 may be released by a foot lever 78 connected thereto by a suitable flexible connection 79 passing over suitable pulleys 80.

The flying machine may be driven by any suitable means, such as a propeller 81, connected in driving relation with a suitable motor 82 of any character, such as a gasolene engine.

The operation of the device will be readily understood when taken in connection with the above description. When it is desired to fly, the machine is driven along the ground by means of the propeller 81 until it has gained sufficient speed to warrant the operator in tilting the elevational rudder 40 to such an angle that it will raise the machine off the ground. When once in the air, the operator can vary his movement in a vertical direction by a further manipulation of the rudder 40. He can also vary his travel in a horizontal direction by manipulating the directional rudder 57. The action of these rudders can be modified, and the equilibrium of the flying machine as a whole, controlled by the manipulation of the supporting planes 5 to 8, by means of the rotation of the hand wheel 21. Inasmuch as these planes are diagonally pivoted to the frame, the rotation of the wheel 21 will not only tilt the planes 5 to 8 transversely, but will also vary the angle of incidence which these planes normally have to the air through which they are traveling. When it is desired to alight and stop the machine, the brake legs 67 can be lowered by releasing the proper pawl and by rotating the drum 69 so as to project the legs below the level of the wheels 2 to a greater or less extent.

While I have shown one embodiment of my invention, I do not wish to be limited to the specific details thereof, but desire to be protected in various changes, modifications and alterations which may come within the scope of the appended claims.

Having thus described my invention, I claim as new and desire to secure by Letters Patent:—

1. The combination with a frame, of a plurality of series of supporting planes, each extending the full width of the frame and comprising the plurality of supporting planes, said supporting planes having independent diagonal pivots in said frame so as to swing transversely, and means for tilting said diagonally tilted supporting planes in unison.

2. The combination with a frame, of a series of supporting planes diagonally pivoted to said frame, a rudder on said frame, comprising a plurality of planes pivoted so as to swing transversely, and means for simultaneously tilting said supporting planes and said planes on said rudder.

3. The combination with a frame, of a plurality of bars diagonally disposed on said frame and pivotally connected thereto, and a plurality of supporting planes secured to said bars intermediate their side edges and extending directly transversely of said frame.

4. The combination with a frame, of one or more supporting planes on said frame, a rudder pivotally connected to said frame so as to swing about a transverse horizontal axis, said rudder comprising a plurality of planes adapted to tilt about longitudinal horizontal axes, means for swinging said rudder, and means for tilting the planes of said rudder.

5. The combination with a frame, of one or more supporting planes on said frame, a rudder pivotally connected to said frame so as to swing about a horizontal axis, said rudder comprising one or more planes tiltable so as to swing about a longitudinal axis, means for swinging said rudder, and means for swinging said planes of said rudder.

6. The combination with a frame of a plurality of supporting planes, comprising a series of independent planes extending from one side to the other of said frame arranged in vertically alined pairs, said last-mentioned planes being pivoted intermediate their side edges, and means for tilting said last-mentioned planes transversely in unison.

7. The combination with a frame, of supporting planes comprising a plurality of transversely swinging planes, each of which is intermediately pivoted in the frame, and a rudder on said frame comprising planes intermediately pivoted to swing transversely, similar to the main planes.

8. The combination with a frame, of supporting planes comprising a plurality of transversely swinging planes, each of which is intermediately pivoted in the frame, a rudder on said frame comprising planes intermediately pivoted to swing transversely, similar to the main planes, and means for simultaneously adjusting the main planes and the rudder planes.

In testimony whereof I have signed my name to this specification in the presence of two subscribing witnesses.

CARL V. JOHNSON.

Witnesses:
WALLACE MACGREGOR,
D. S. JOHNSON.